United States Patent
Ku et al.

(10) Patent No.: US 10,434,587 B2
(45) Date of Patent: Oct. 8, 2019

(54) MITER SAW WITH ENHANCED ADJUSTABLE MITER ANGLE

(71) Applicant: REXON INDUSTRIAL CORP., LTD., Taichung (TW)

(72) Inventors: Yung-Chiang Ku, Taichung (TW); Yung-Wen Chen, Taichung (TW); Tsung-Fa Wang, Taichung (TW)

(73) Assignee: REXON INDUSTRIAL CORP., LTD., Taichung (TW)

( * ) Notice: Subject to any disclaimer, the term of this patent is extended or adjusted under 35 U.S.C. 154(b) by 0 days.

(21) Appl. No.: 16/028,468

(22) Filed: Jul. 6, 2018

(65) Prior Publication Data

US 2019/0015913 A1    Jan. 17, 2019

(30) Foreign Application Priority Data

Jul. 12, 2017    (TW) .............................. 106123385 A

(51) Int. Cl.
| | |
|---|---|
| *B27B 27/06* | (2006.01) |
| *B23D 47/02* | (2006.01) |
| *B23D 45/04* | (2006.01) |

(52) U.S. Cl.
CPC ........... *B23D 47/02* (2013.01); *B23D 45/044* (2013.01); *B23D 47/025* (2013.01); *B27B 27/06* (2013.01)

(58) Field of Classification Search
CPC .... B23D 47/02; B23D 45/044; B23D 47/025; B27B 27/06

(Continued)

(56) References Cited

U.S. PATENT DOCUMENTS

| | | | | |
|---|---|---|---|---|
| 4,875,399 | A * | 10/1989 | Scott .................... | B23D 45/044 83/468.3 |
| 7,228,775 | B2 * | 6/2007 | Wang ................... | B23D 45/048 83/471.3 |

(Continued)

FOREIGN PATENT DOCUMENTS

| | | |
|---|---|---|
| CN | 103240461 B | 8/2013 |
| TW | I245680 B | 12/2005 |
| TW | I542458 B | 7/2016 |

OTHER PUBLICATIONS

Taiwanese Office Action in corresponding Taiwanese Application No. 106123385, dated Dec. 26, 2017.

*Primary Examiner* — Kenneth E Peterson
*Assistant Examiner* — Liang Dong
(74) *Attorney, Agent, or Firm* — Bacon & Thomas, PLLC

(57) ABSTRACT

A miter saw includes a base, a worktable pivotally mounted to the base, a fence mounted at the worktable, an operating handle connected to the worktable, and two opposing supporting units respectively mounted to two opposite sides of the base. Each supporting unit includes a fixed panel and a movable panel pivoted to the fixed panel and biasable between an extended position where the operating handle is stoppable by the fixed panel upon operation to rotate the worktable and a first included angle is defined between a cutting slot and a fence of the worktable and a received position where the operating handle is stoppable by the movable panel upon operation to rotate the worktable and a second included angle larger than the first included angle is defined between the cutting slot and the fence of the worktable. Thus, the miter saw achieves the effect of increasing the miter angle.

6 Claims, 8 Drawing Sheets

(58) Field of Classification Search
USPC .................. 83/490, 471.3, 473; 144/287
See application file for complete search history.

(56) References Cited

U.S. PATENT DOCUMENTS

| | | | |
|---|---|---|---|
| 2011/0048203 A1* | 3/2011 | Cheng .................. | B23D 47/025 83/471.3 |
| 2013/0160629 A1* | 6/2013 | Feldner ................ | B23D 47/025 83/648 |
| 2016/0052159 A1* | 2/2016 | Lin ...................... | B23D 47/025 83/468.1 |

* cited by examiner

MITER SAW WITH ENHANCED ADJUSTABLE MITER ANGLE

BACKGROUND OF THE INVENTION

1. Field of the Invention

The present invention relates to saw cutting technology and more particularly, to a miter saw with enhanced adjustable miter angle.

2. Description of the Related Art

Referring to FIGS. 1 and 2, a conventional miter saw 1 generally comprises a base 2, a worktable 3 mounted at the base 2, a cutting unit 4 mounted at the worktable 3, and a fence 5 mounted to the base 2 and straddles on the worktable 3. The worktable 3 provides a cutting slot 6 corresponding to the cutting unit 4. When the workpiece needs to be obliquely cut for special situations (such as in accordance with the angle of a wall corner), the handle 7 is operated to rotate the worktable 3 relative to the base 2, so that the cutting unit 4 follows the worktable 3 to change the included angle between the cutting unit 4 and the fence 5. After the worktable 3 is fixed, the workpiece can then be cut.

As seen in FIG. 2, during the rotation of worktable 3, once the handle 7 touches the base 2, the worktable 3 can no longer continue to rotate, that is, the included angle (that is, the miter angle of the workpiece) between the cutting unit 4 and the fence 5 can only be adjusted to the extent where the handle 7 touches the base 2. However, because the width of base 2 is fixed and cannot be adjusted, the miter angle of the workpiece will be limited, resulting in problems with larger miter angles and inconvenience in processing.

SUMMARY OF THE INVENTION

The present invention has been developed in view of the above identified circumstances. It is one of the main objects of the present invention to provide a miter saw, which has an increased range of the miter angle of the workpiece to enhance the convenience of operation.

To achieve this and other objects of the present invention, a miter saw comprises a base, a worktable, an operating handle, a fence, a cutting unit and two opposing supporting units. The worktable is pivotally mounted to the base. The worktable comprises a work surface, and a cutting slot cut through the work surface. The operating handle is connected to the periphery of the worktable and operable to rotate the worktable relative to the base. The fence is affixed to the base and is straddled on the worktable. The cutting unit comprises a saw arm and a saw blade. The saw arm is pivotally connected to the worktable. The saw blade is pivotally mounted in the saw arm corresponding to the cutting slot of the worktable. The two opposing supporting units each comprise a fixed panel and a movable panel. The fixed panel comprises a first stop portion. The movable panel comprises a second stop portion. Further, the fixed panel has one end thereof affixed to the periphery of the base. The movable panel has one end thereof pivoted to an opposite end of the fixed panel so that the movable panel is biasable relative to the fixed panel between an extended position where the distance between the first stop portion of the fixed panel and the worktable is smaller than the distance between the second stop portion of the movable panel and the worktable so that the operating handle is stoppable by the first stop portion of the fixed panel upon operation of the operating handle to rotate the worktable and a received position where the distance between the first stop portion of the fixed panel and the worktable is larger than the distance between the second stop portion of the movable panel and the worktable so that the operating handle is stoppable by the second stop portion of the movable panel upon operation of the operating handle to rotate the worktable. When the operating handle touches the first stop portion of the fixed panel, a first included angle smaller than 90° is defined between the cutting slot of the worktable and the fence. When the operating handle touches the second stop portion of the movable panel, a second included angle smaller than 90° and larger than the first included angle is defined between the cutting slot of the worktable and the fence. Thus, through the action of the movable panel between the two different positions, the included angle between the cutting slot of the worktable and the fence is relatively changed, thereby increasing the range of the miter angle of the workpiece and enhancing the convenience of the operation.

Preferably, the fixed panel comprises a bearing plane disposed at an elevation below the elevation of the work surface of the worktable. The movable panel comprises a first supporting plane and an opposite second supporting plane. The first supporting plane is disposed coplanar with the work surface of the worktable or below the elevation of the work surface of the worktable when the movable panel is in the extended position. The first supporting plane is abutted against the bearing plane of the fixed panel and the second supporting plane of the movable panel is disposed coplanar with the work surface of the worktable or below the elevation of the work surface of the worktable when the movable panel is located in the received position. At this time, the two movable panels can not only provide a support effect for the workpieces of general size after received, but also can achieve the effect of reducing the volume of the miter saw.

Preferably, the fixed panel further comprises a first pivot portion located at one end thereof and protruding over the bearing plane. The first pivot portion comprises a first lug and an opposing second lug. The first lug forms the first stop portion. The movable panel comprises a second pivot portion located at one end thereof and pivotally connected to the first pivot portion of the fixed panel and has the second stop portion located at an opposite end thereof.

Preferably, the fixed panel defines a first abutment surface. The second pivot portion of the movable panel defines a second abutment surface. The second abutment surface is abutted against the first abutment surface of the first pivot portion of the fixed panel when the movable panel is in the extended position.

Preferably, the movable panel further comprises a chamfer located at an opposite end thereof remote from the end pivotally engaged to an opposite end of said fixed panel and forming said second stop portion.

Other and further advantages and features of the present invention will be understood by reference to the following specification in conjunction with the accompanying drawings.

DETAILED DESCRIPTION OF THE INVENTION

The technical contents and features of the present invention will be described in detail by the illustrated preferred embodiments in conjunction with the annexed drawings. The direction terms of "front", "back", "left", "right", "top" and "bottom" mentioned in the content of the present specification are exemplary descriptions based on normal directions of use, and are not intended to limit the scope of claims.

Figure 1:
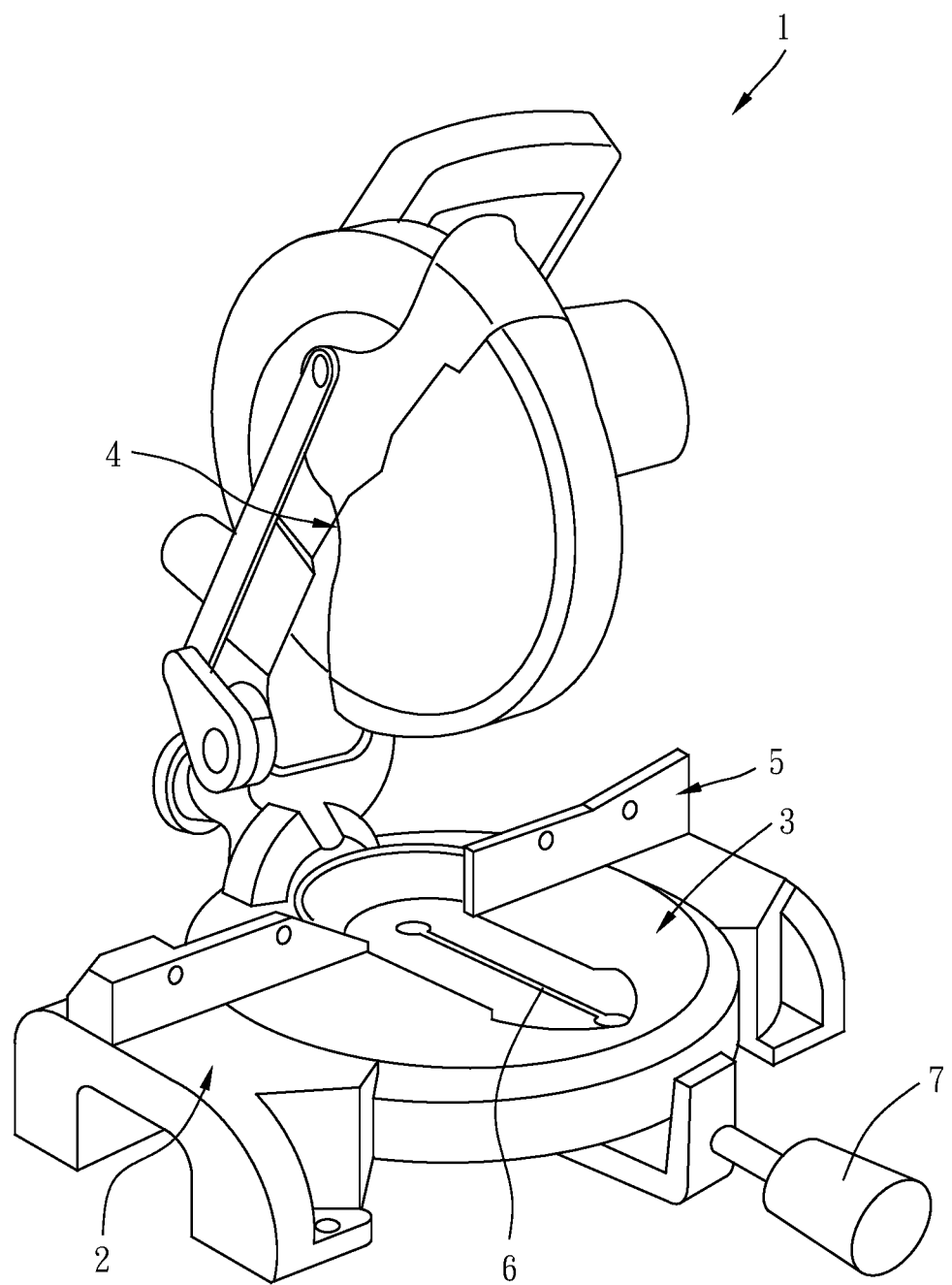
FIG. 1 is an oblique top elevational view of a miter saw according to the prior art.
Figure 2:
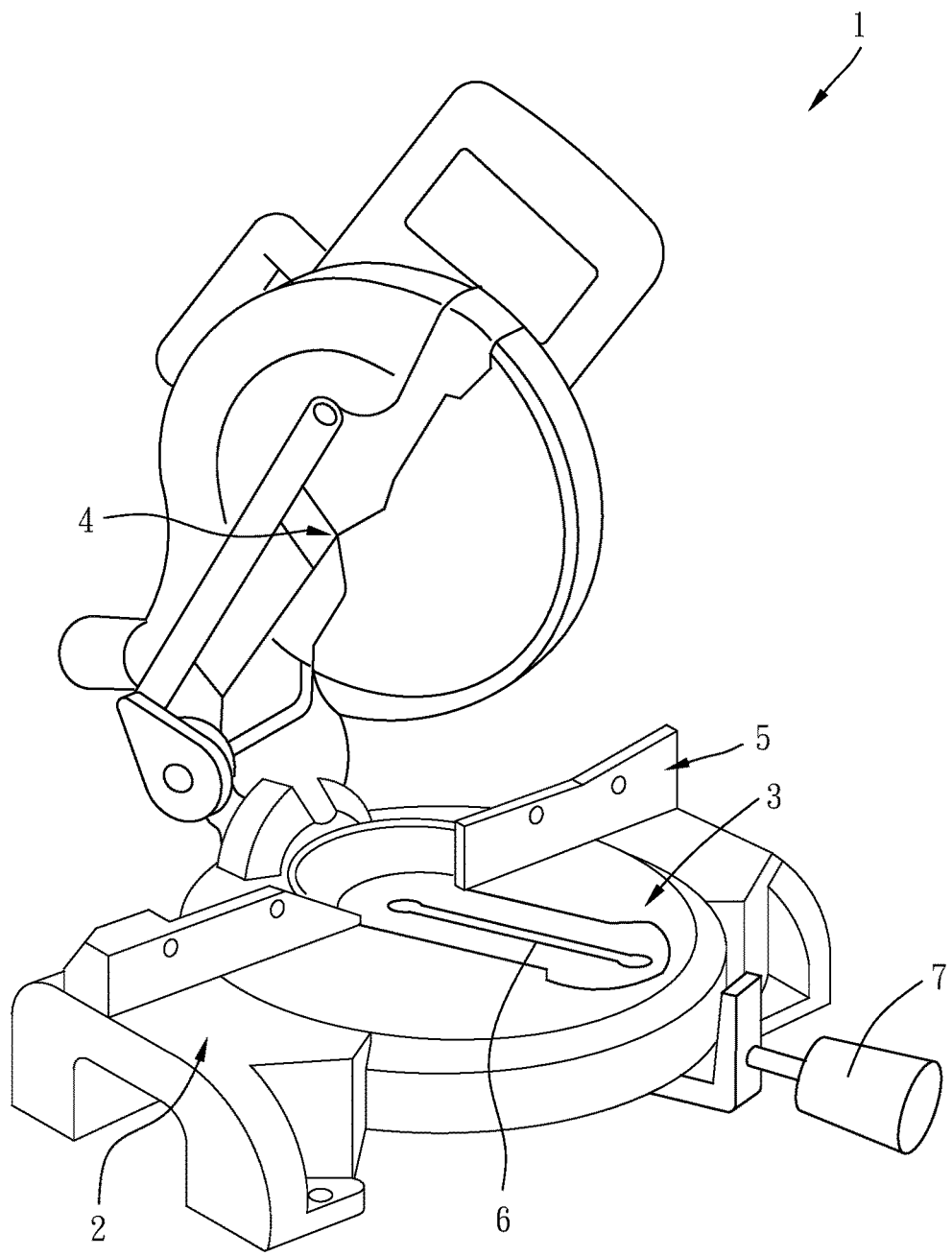
FIG. 2 corresponds to FIG. 1, illustrating the angle of the cutting unit adjusted relative to the worktable.
Figure 3:
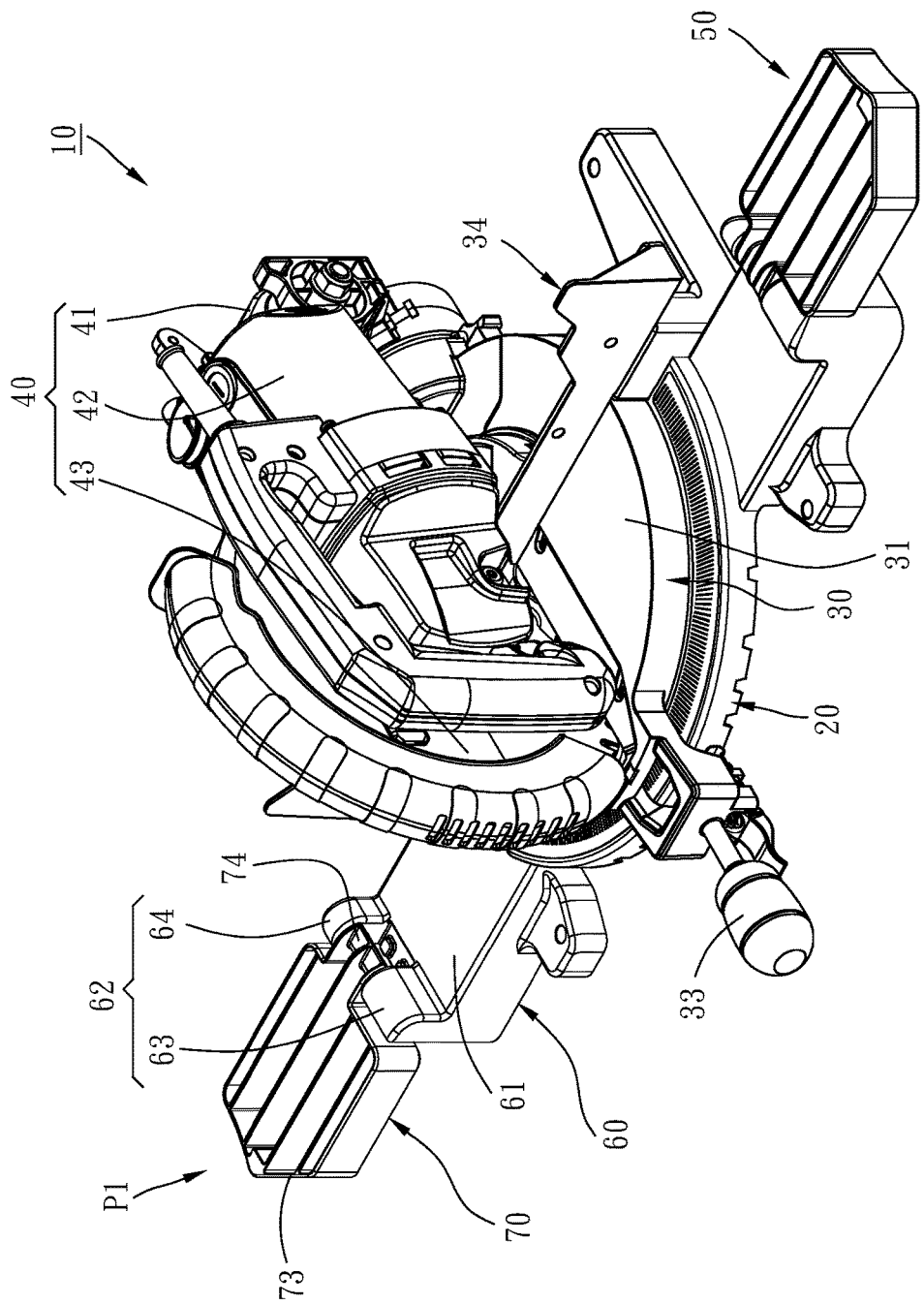
FIG. 3 is an oblique top elevational view of a miter saw in accordance with the present invention.

Referring to FIG. 3, a miter saw 10 in accordance with the present invention is shown. The miter saw 10 comprises a base 20, a worktable 30, an operating handle 33, a fence 34, a cutting unit 40, and two opposing supporting units 50.

Figure 5:
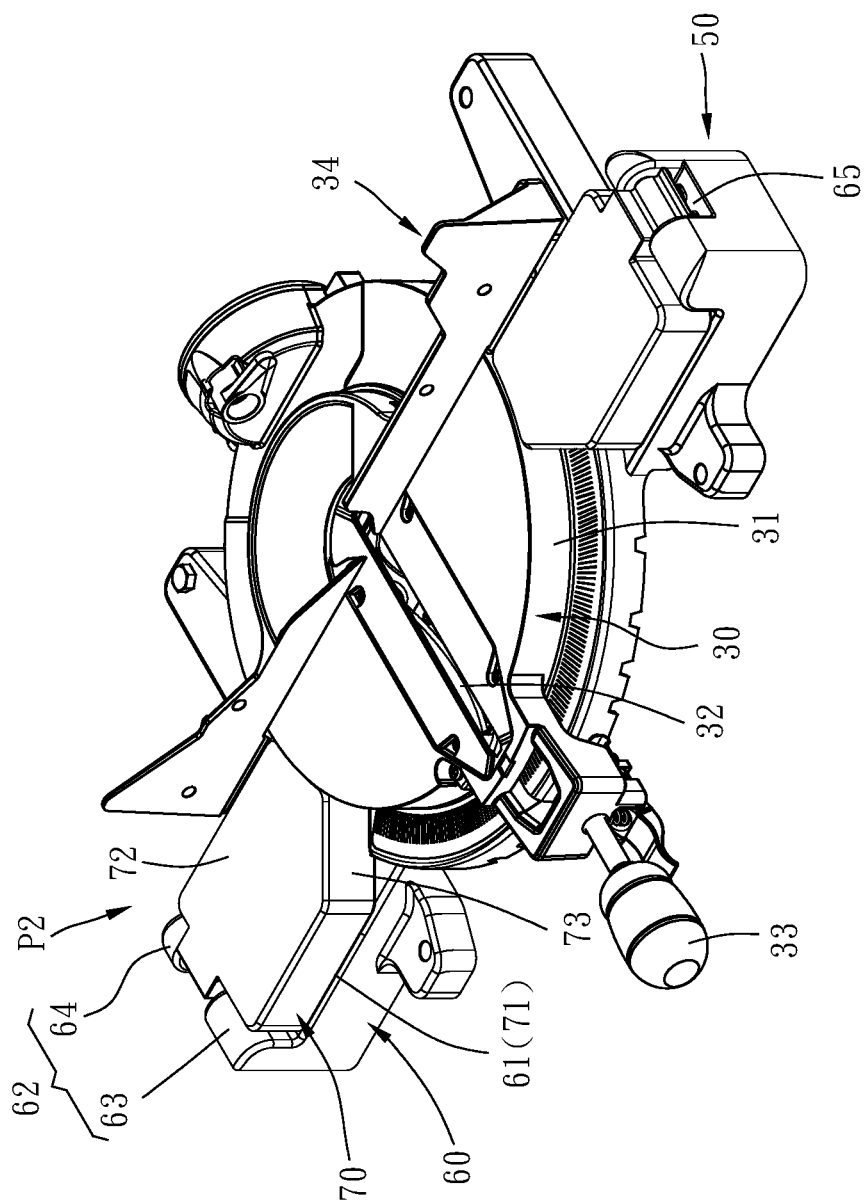
FIG. 5 is a partial sectional plane view of the miter saw in accordance with the present invention (the cutting unit excluded), illustrating the movable panels in the received position.
Figure 6:
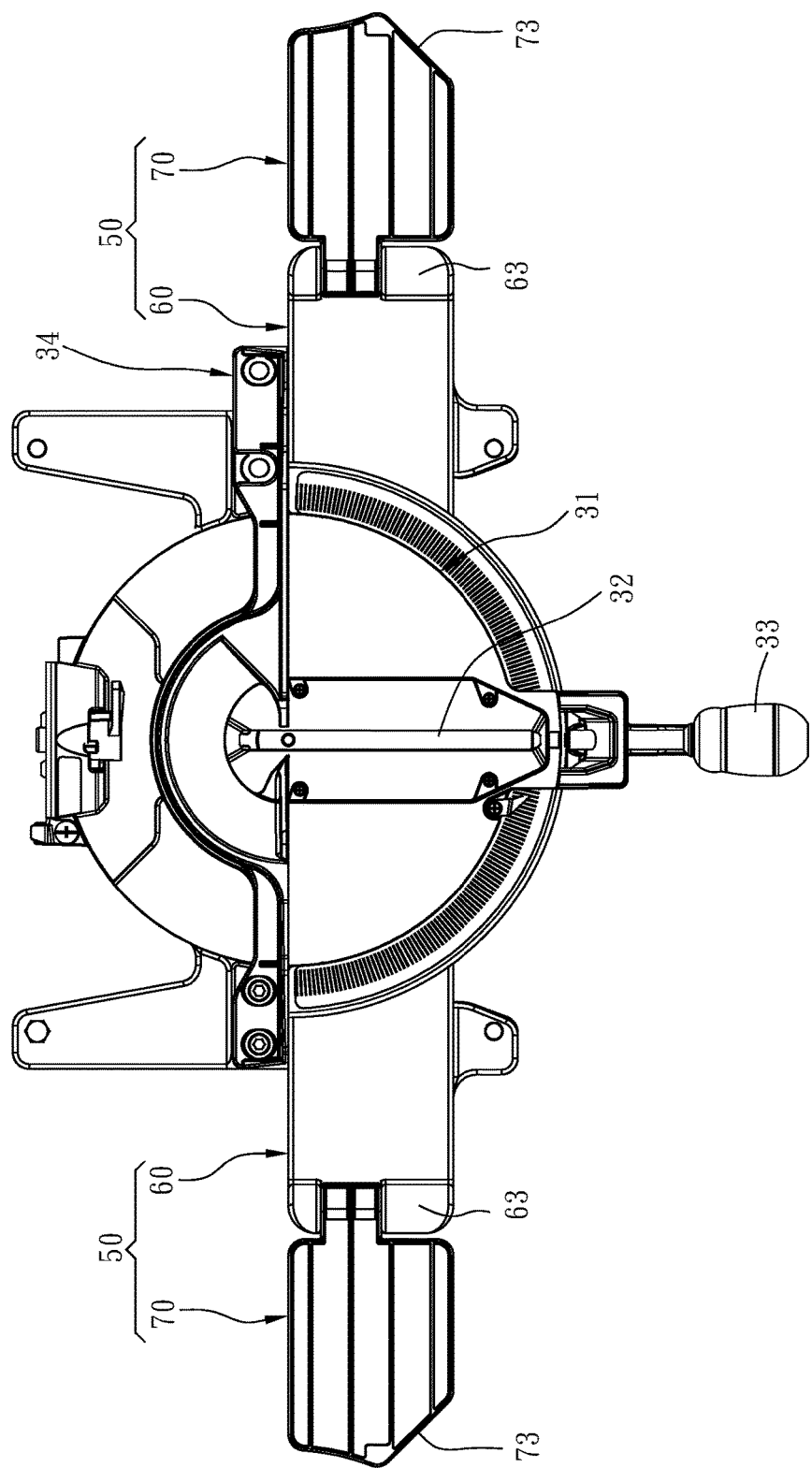
FIG. 6 is a top view of the miter saw in accordance with the present invention (the cutting unit excluded) before adjustment of the angle of the worktable.

The worktable 30 is rotatably mounted on a top surface of the base 20, comprising a work surface 31 adapted for carrying a workpiece (not shown) and a cutting slot 32 defined in the work surface 31 (see FIG. 5).

The operating handle 33 is connected to a periphery of the worktable 30 and operable by the user to rotate the worktable 30 relative to the base 20. The operating handle 33 is rotatable by at least including, for example, a pin and slot configuration, to allow the setting of the angle of the worktable at predefined angles. It is also understood that the handle 33 can include a screwable handle to allow engagement of the handle with the base to set the desired miter cut angle.

The fence 34 is fixedly mounted to the base 20 and is straddled on the work surface 31 of the worktable 30 for supporting the workpiece to enhance cutting stability.

The cutting unit 40 comprises a saw arm 41, a driving unit 42 and a saw blade 43. The saw arm 41 has one end thereof pivotally connected to a rear side of the worktable 30. The driving unit 42 is installed on the saw arm 41 to provide a power source. The saw blade 43 is installed on the saw arm 41 and connected to the driving unit 42 in such a manner that the saw blade 43 can be driven to rotate by the driving unit 42 and can be moved up and down relative to the work surface 31 of the worktable 30 by the saw arm 41. When the saw blade 43 is moved down, a part of the saw blade 43 will enter the cutting slot 32.

The two supporting units 50 are respectively disposed on opposing left and right sides of the base 20, each comprising a fixed panel 60 and a movable panel 70.

The fixed panel 60 defines a bearing plane 61 located below the elevation of the work surface 31 of the worktable 30 (see FIG. 4). Further, the fixed panel 60 has one end thereof affixed to the base 20, and an opposite end thereof terminating in a first pivot portion 62 that protrudes above or over the bearing plane 61. The first pivot portion 62 is formed of a first lug 63 and an opposing second lug 64. The first lug 63 works as a first stop portion. Further, as illustrated in FIGS. 4 and 5, the first pivot portion 62 defines a first abutment surface 65 between the first lug 63 and the second lug 64.

The movable panel 70 comprises a first supporting plane 71, a second supporting plane 72 opposite to the first supporting plane 71, a chamfer 73 located at one end thereof and working as a second stop portion, a second pivot portion 74 located at an opposite end thereof and pivotally connected to the first pivot portion 62 of the fixed panel 60 for allowing the movable panel 70 to be pivotally biased relative to the fixed panel 60 between an extended position P1 (see FIG. 3) and a received position P2 (see FIG. 5), and a second abutment surface 75 defined on the second pivot portion 74.

Figure 4:
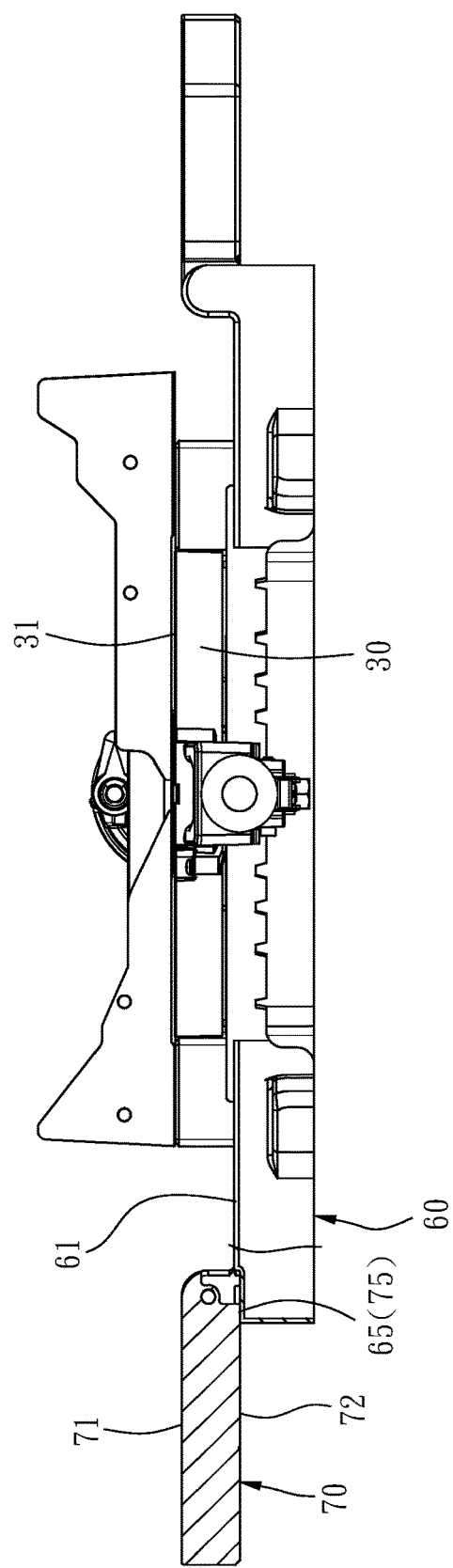
FIG. 4 is a partial sectional plane view of the miter saw in accordance with the present invention (the cutting unit excluded), illustrating the first abutment surface of the fixed panel abutted against the second abutment surface of the respective movable panel.

Thus, when the movable panel 70 is in the extended position P1 as shown in FIGS. 3 and 4, the first supporting plane 71 of the movable panel 70 is located away from the work surface 31 of the worktable 30 by a predetermined distance and is coplanar with the work surface 31 of the worktable 30 or at an elevation not higher than the work surface 31 of the worktable 30. At this time, the second abutment surface 75 of the movable panel 70 is abutted against the first abutment surface 65 of the first pivot portion 62 of the fixed panel 60, such that the movable panel 70 is horizontally configured. Thus, when cutting workpieces of large sizes, the movable panels 70 of the two supporting units 50 provide additional support in addition to the worktable 30. When collapsing the movable panels 70 of the two supporting units 50, by biasing the two movable panels 70 180° toward the worktable 30 to abut the respective first supporting planes 71 against the bearing planes 61 of the respective fixed panels 60 as shown in FIG. 5. At this time, the second supporting planes 72 of the movable panels 70 are coplanar with the work surface 31 of the worktable 30 or at an elevation not higher than the work surface 31 of the worktable 30. In this way, not only do the two movable panels 70 provide support for the workpieces of general size, but also effectively reduce the volume of the miter saw.

Figure 7:
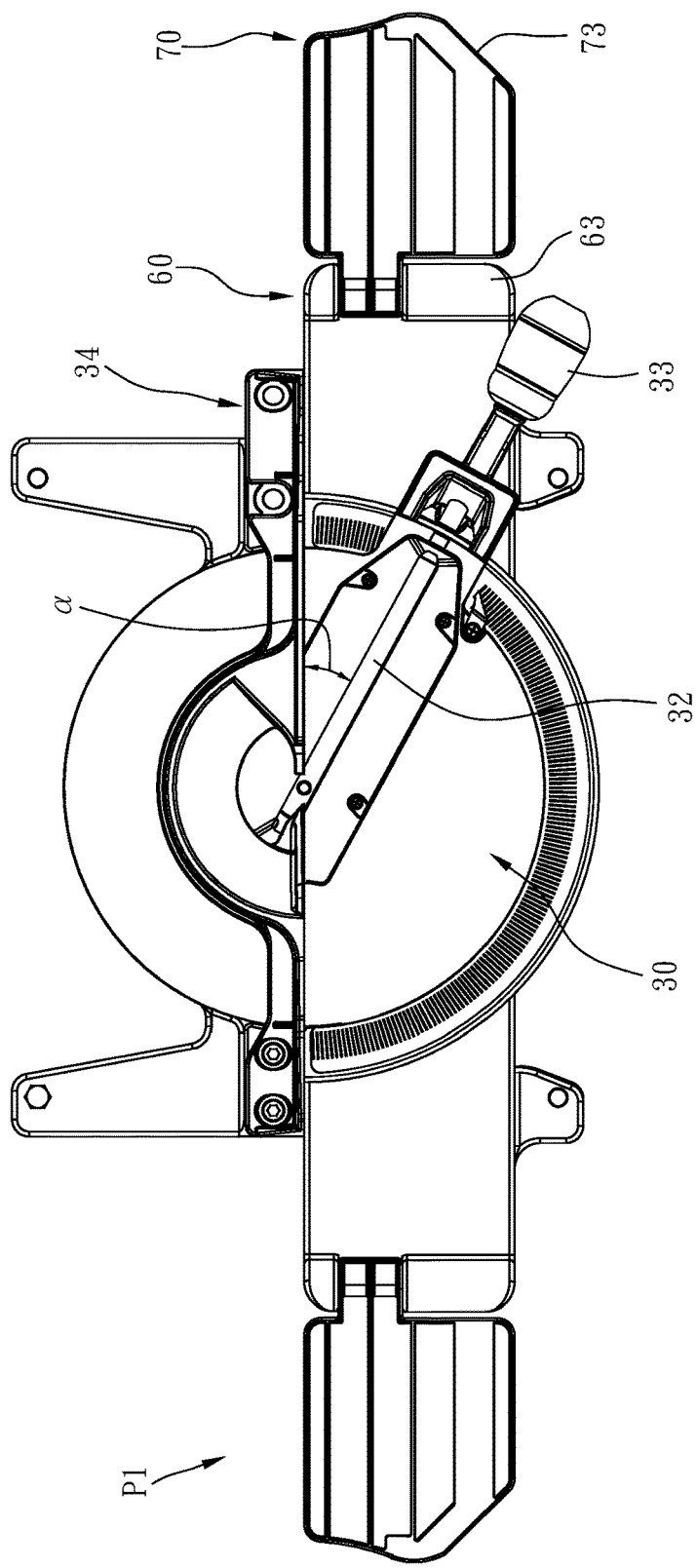
FIG. 7 is similar to FIG. 6, illustrating the operating handle touched the first stop portion of the fixed panel.

On the other hand, when the workpiece needs to be cut obliquely, the operating handle 33 is operable to rotate the worktable 30 and to further change the angle between the cutting slot 32 and the fence 34. In the present invention, the angle between the cutting slot 32 and the fence 34 will be adjustable because of the position of the movable panels 70. In detail, when the movable panel 70 is located in the extended position P1 as shown in FIG. 7, the distance between the first stop portion of the fixed panel 60 (that is, the first lug 63) and the worktable 30 is smaller than the distance between the second stop portion of the movable panel 70 (that is, the chamfer 73) and the worktable 30. Thus, during the operation of the operating handle 33 to rotate the worktable 30, the operating handle 33 can be simply moved to the angle where it touches the first stop portion 63 of the fixed panel 60. When the operating handle 33 touches the first stop portion 63 of the fixed panel 60, a first included angle α smaller than 90° is defined between the cutting slot 32 of the worktable 30 and the fence 34. In this embodiment, the first included angle α is equal to or smaller than 22.5°.

Figure 8:
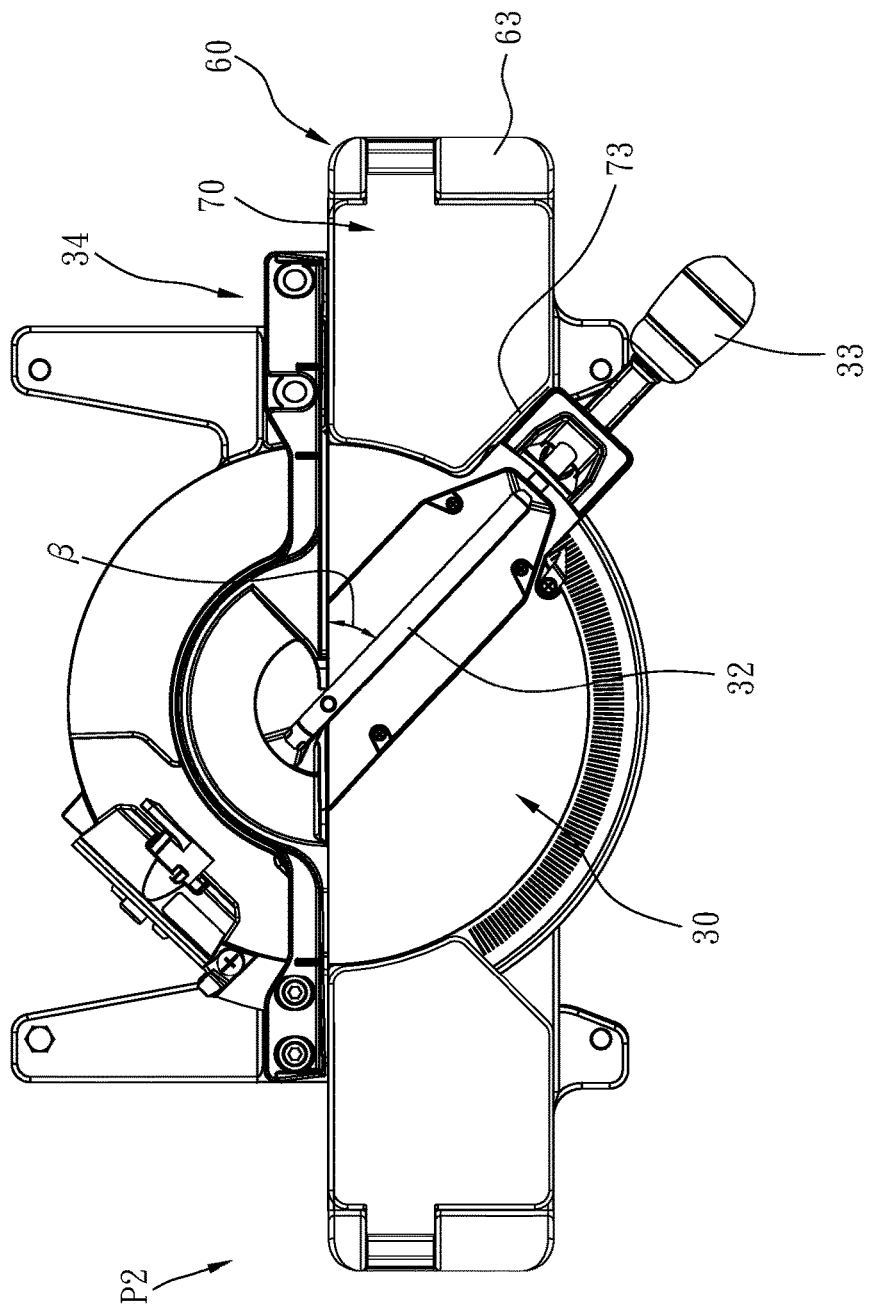
FIG. 8 is similar to FIG. 6, illustrating the operating handle touched the second stop portion of the movable panel.

When the movable panel 70 is located in the received position P2 as shown in FIG. 8, the distance between the first stop portion 63 of the fixed panel 60 and the worktable 30 is larger than the distance between the second stop portion 73 of the movable panel 70 and the worktable 30, thus, during the operation of the operating handle 33 to rotate the worktable 30, the operating handle 33 can simply be moved to the angle where it touches the second stop portion, e.g., the chamfer 73, of the movable panel 70. When the operating handle 33 touches the chamfer 73 of the movable panel 70, a second included angle β smaller than 90° is defined between the cutting slot 32 of the worktable 30 and the fence 34. In this embodiment, the second included angle β is equal to or smaller than 45°. In other words, the first included angle α smaller than 90° defined between the cutting slot 32 of the worktable 30 and the fence 34 when the movable panel 70 is in the extended position P1 is smaller than the second included angle β when the movable panel 70 is in the received position P2, and the user can adjust the position of the movable panel 70 according to the desired cutting angle.

In conclusion, the miter saw 10 of the present invention can achieve the effect of increasing the support area after the two movable panels 70 are extended and can achieve the effect of reducing the volume after the two movable panels 70 are received. Further, through the configuration of the first stop portion that is the first lug 63 of the fixed panel 60 and the second stop portion that is the chamfer 73 of the movable panel 70, and the action of the movable panel 70 between the two different positions, the range of the miter angle of the workpiece is increased, thereby increasing the convenience of operation.

What is claimed is:

1. A miter saw, comprising:
a base;
a worktable pivotally mounted to said base, said worktable comprising a work surface and a cutting slot cut through said work surface;
an operating handle connected to a periphery of said worktable and operable to rotate said worktable relative to said base;
a fence affixed to said base and positioned on said worktable;
a cutting unit comprising a saw arm and a saw blade, said saw arm being pivotally connected to said worktable, said saw blade being pivotally mounted in said saw arm corresponding to said cutting slot of said worktable; and
two opposing supporting units each comprising a fixed panel and a movable panel, said fixed panel comprising a first stop portion, said movable panel comprising a second stop portion, said fixed panel having one end thereof affixed to a periphery of said base, said movable panel having one end thereof pivotally engaged to an opposite end of said fixed panel so that said movable panel is biasable relative to said fixed panel between an extended position where a distance between said first stop portion of said fixed panel and said worktable is smaller than a distance between said second stop portion of said movable panel and said worktable so that said operating handle is stoppable by said first stop portion of said fixed panel upon operation of said operating handle to rotate said worktable and a received position where the distance between said first stop portion of said fixed panel and said worktable is larger than the distance between said second stop portion of said movable panel and said worktable so that said operating handle is stoppable by said second stop portion of said movable panel upon operation of said operating handle to rotate said worktable;
wherein when said operating handle touches said first stop portion of said fixed panel, a first included angle smaller than 90° is defined between said cutting slot of said worktable and said fence; when said operating handle touches said second stop portion of said movable panel, a second included angle smaller than 90° and larger than said first included angle is defined between said cutting slot of said worktable and said fence.

2. The miter saw as claimed in claim 1, wherein said fixed panel comprises a bearing plane disposed at an elevation below the elevation of said work surface of said worktable; said movable panel comprises a first supporting plane and an opposite second supporting plane, said first supporting plane being disposed coplanar with said work surface of said worktable or below the elevation of said work surface of said worktable when said movable panel is located in said extended position, said first supporting plane being abutted against said bearing plane of said fixed panel and said second supporting plane of said movable panel being disposed coplanar with said work surface of said worktable or below the elevation of said work surface of said worktable when said movable panel is located in said received position.

3. The miter saw as claimed in claim 1, wherein said fixed panel further comprises a first pivot portion located at one end thereof that extends above said bearing plane, said first pivot portion comprising a first lug and an opposing second lug, said first lug forming said first stop portion; said movable panel comprising a second pivot portion located at one end thereof and pivotally connected to said first pivot portion of said fixed panel and has said second stop portion located at an opposite end thereof.

4. The miter saw as claimed in claim 3, wherein said first pivot portion of said fixed panel defines a first abutment surface; said second pivot portion of said movable panel defines a second abutment surface, said second abutment surface being abutted against said first abutment surface of said first pivot portion of said fixed panel when said movable panel is in said extended position.

5. The miter saw as claimed in claim 1, wherein said movable panel further comprises a chamfer located at an opposite end thereof remote from the end pivotally engaged to an opposite end of said fixed panel and forming said second stop portion.

6. The miter saw as claimed in claim 1, wherein said first included angle is equal to or smaller than 22.5°; said second included angle is equal to or smaller than 45°.

* * * * *